United States Patent Office 2,779,775
Patented Jan. 29, 1957

2,779,775

PHOSPHATE DERIVATIVES OF 9α-FLUORO-STEROIDS

Lewis H. Sarett, Princeton, N. J., assignor to Merck & Co., Inc., Rahway, N. J., a corporation of New Jersey No Drawing. Application September 30, 1954,
Serial No. 459,531

8 Claims. (Cl. 260—397.45)

This invention relates to steroids and particularly to phosphate derivatives of 9α-fluoro cortisone and 9α-fluoro hydrocortisone, to processes for preparing them and to intermediate compounds thus obtained.

Since the discovery of the remarkable properties of cortisone and hydrocortisone for use in the therapy of arthritis and related diseases, there has been a widespread interest in finding other steroids and derivatives of these compounds which not only possess the desirable properties of these hormones, but also possess other desirable properties which would make them more adaptable to a wider range of methods of administration. One of the most desirable properties which has been sought for hormones is water solubility. The advantages of having water soluble forms of cortisone and hydrocortisone are readily apparent. As an example, the facile administration of such hormones dissolved in a water solution allows almost instantaneous utilization of the hormones by the system. When the usual saline suspension of the acetate esters are injected, however, it requires from 4 to 24 hours before such utilization occurs. This quick action would allow rapid alleviation of diseases requiring hormone therapy.

One of the primary factors which has hindered the search for water-soluble forms or derivatives of cortisone and hydrocortisone is the particular characteristic of these hormones in that many of their derivatives do not maintain the necessary adrenal activity. This may be demonstrated as for example in the case of cortisone sulfate which exhibits little or no cortical activity.

A primary object of the present invention is to produce water-soluble derivatives of 9α-fluoro-cortisone and 9α-fluoro-hydrocortisone. A related object is to produce such derivatives without any reduction in cortical activity. A further object is to provide processes for producing these derivatives and intermediates useful in such processes. Other objects and the advantages of the invention will appear hereinafter.

The compounds which are the subject of the invention are phosphate derivatives of steroids having the general formula:

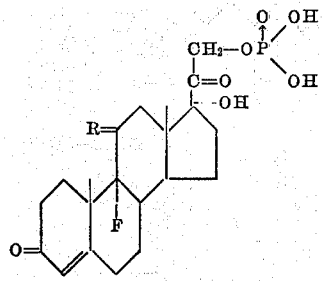

wherein R is an oxygen group (O=) thereby forming an 11-keto steroid or a hydrogen and β-hydroxy group

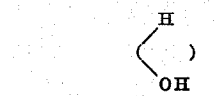

thereby forming an 11-β-hydroxy steroid; and salts thereof. These compounds are soluble in a large range of solvents including water, and also maintain the same high cortical activity as cortisone and hydrocortisone.

The compounds of this invention may be prepared by reacting 9α-fluoro-4-pregnene-17α, 21-diol-11-R-3,20-dione (Compound I), wherein R is as defined above, with an ethylenedioxy yielding compound to form 9α-fluoro-3-ethylenedioxy-5-pregnene-17α,21-diol-11-R-20-one (Compound II), which is then reacted with an organic sulfonyl chloride compound to produce the corresponding 9α-fluoro - 3 - ethylenedioxy-5-pregnene-17α,21-diol-11-R-20-one-21-sulfonate compound (Compound III). This compound is then treated with an iodide salt to form the corresponding 21-iodo pregnene (Compound IV) which when reacted with an organic phosphate forms the corresponding pregnene 21-organic phosphate compound (Compound V). This latter compound is then hydrogenated in the presence of a hydrogenation catalyst and a tertiary amine to form the corresponding 21-amine salt of 9α-fluoro-3-ethylenedioxy-5-pregnene-17α,21-diol-11-R-20-one-21-phosphate (Compound VI). This latter compound is hydrolyzed to produce the 21-phosphate of 9α-fluoro cortisone or 9α-fluoro hydrocortisone (Compound VIII) which may be converted to a phosphate salt (Compound IX) by treating with a basic substance.

These reactions may be chemically represented as follows wherein R is as defined above, $R^2$ is an alkyl group, $R^3$ is an aryl group, $R^4$ is a tertiary amine and Y is a metal group and $n$ is a whole integer varying from 1 to 2.

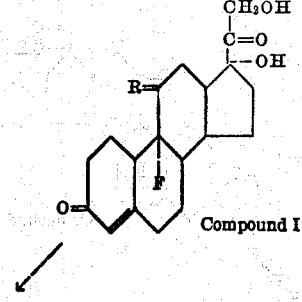

Compound I

Compound II
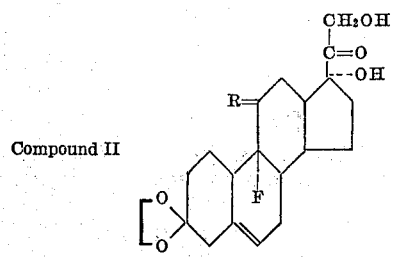
Compound III
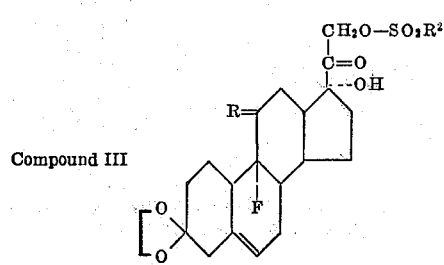
Compound IV
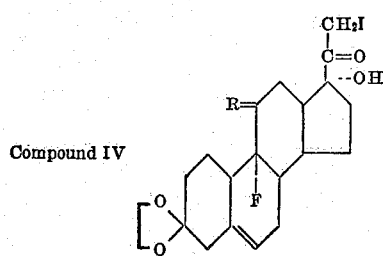
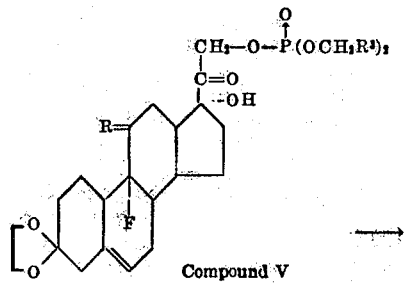
Compound V
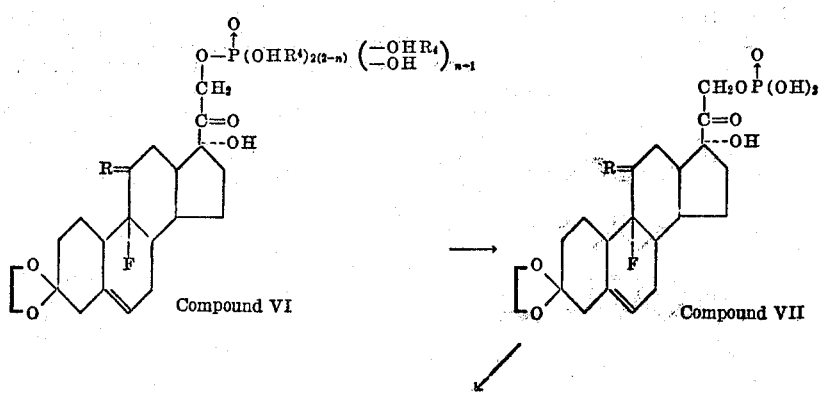
Compound VI            Compound VII

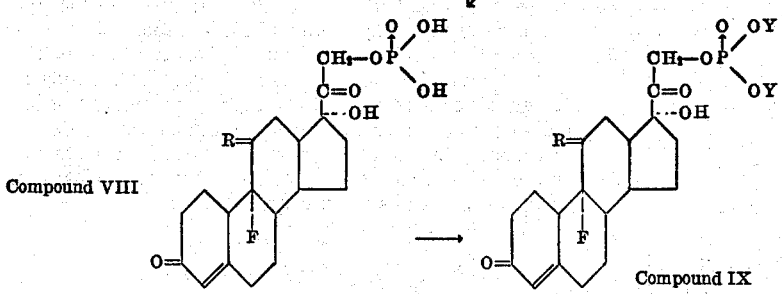

The 9α-fluoro-4-pregnene-17α,21-diol-11-R-3,20-dione, wherein R is as defined above, is converted to the corresponding 9α-fluoro-3-ethylenedioxy-5-pregnene-17α,21-diol-11-R-20-one. This reaction is conveniently achieved by reaction with ethylene glycol in the presence of an acid catalyst or by an exchange reaction with an ethylenedioxy yielding compound such as an ethylenedioxy derivative of a lower aliphatic ketone such as acetone, methyl ethyl ketone, mesityl oxide and the like. If desired, this reaction may be effected in an inert solvent such as benzene, toluene, tetrahydrofuran or dioxane. The reaction proceeds rapidly at elevated temperatures. As for example, at the reflux temperature the reaction is complete in 1 to 5 hours. Ordinarily a small amount of strong acid such as p-toluene sulfonic acid or sulfuric acid is added to enhance the rate of reaction. Following completion of the reaction the acid is neutralized with a base, the mixture is diluted with water and the desired product is extracted from the mixture with an immiscible solvent. The product may be isolated by removing the solvent by evaporation under reduced pressure.

The 9α-fluoro-3-ethylenedioxy-5-pregnene-17α,21-diol-11-R-20-one, wherein R is as defined above, is reacted with an organic sulfonyl chloride to produce the corresponding 21-sulfonoxy-pregnene compound. The sulfonyl chloride is of the formula $R^2SO_2Cl$ wherein $R^2$ is an alkyl group preferably having a carbon chain length of from one to six carbon atoms. Typical examples of such groups are methyl, ethyl and propyl. The reaction is preferably carried out in a solvent such as pyridine or other tertiary amines. The reaction is usually complete in about 1 to 3 hours when the temperature is maintained at approximately 0° C. The product is recovered by diluting the reaction mixture with water and recovering the crystalline material.

The 21-sulfonyl derivative of the 9α-fluoro-3-ethylenedioxy-5-pregnene-17α,21-diol-11-R-20-one is converted to the corresponding 21-iodo compound by treating with an iodide salt. The reaction is conveniently effected by contacting the reactants in a solvent such as an alcohol, ketone or ether. Typical examples of suitable solvents are methanol, ethanol, propanol, methyl butyl ether, ethyl ether, acetone and methyl ethyl ketone. The reaction is preferably carried out at a temperature of approximately 25° to 100° C. and is usually complete in ½ to 2 hours. The product may be separated from the reaction mixture by the addition of a non-solvent such as water.

The 9α-fluoro-21-iodo-3-ethylenedioxy-5-pregnene-17α-ol-11-R-20-one is converted to the corresponding 21-organic phosphate compound by treating with an organic phosphate. The organic phosphate is of the formula $(R^3—CH_2O)_2PO(OH)$ wherein $R^3$ is an aryl group having a six carbon ring. Examples of such groups are phenyl and substituted phenyls. The organic phosphate is preferably used in the form of a salt such as the silver, sodium, potassium, barium, or calcium salt or other metal salts which form insoluble iodides. The reaction is conveniently carried out in the solvent for the reactants such as benzene, toluene, xylene or dioxane and at the reflux temperature of the solvent. The reaction usually requires from 4 to 26 hours for completion. The product may be recovered by the addition of a non-solvent such as an ether.

The 21-organic phosphate compound of 9α-fluoro-3-ethylenedioxy-5-pregnene-17α,21-diol-11-R-20-one is converted to a 21 tertiary amine salt of the 21-phosphate compound by treating with a tertiary amine ($R^4$) and hydrogenating in the presence of a hydrogenation catalyst. Suitable tertiary amines are N-methyl morpholine, N-methyl piperidine, dimethylaniline, diethylaniline and trimethylamine. The hydrogenation catalyst may be any of the conventional catalysts such as platinum, nickel or palladium and oxides of these metals. The catalyst may be supported on a suitable carrier such as barium sulfate, calcium carbonate, barium carbonate and the like. The reaction is preferably carried out in a solvent such as an alcohol as for example ethanol, methanol or propanol. The reaction is carried out at approximately 0° to 100° C., preferably at room temperature, until two mols of hydrogen are taken up. The product is separated from the reaction mixture by any of the conventional means such as diluting with water, removing the impurities by extracting with a solvent and concentrating the water solution to dryness.

The 3-ethylenedioxy group of the 21-amine salt is hydrolyzed to form the 21-phosphate of 9α-fluoro-cortisone or hydrocortisone. The hydrolysis may be carried out by treating with a strong acid in a suitable solvent such as acetone, methanol, ethanol, benzene, or toluene. Strong acids such as hydrochloric acid, sulfuric acid, perchloric acid and p-toluene sulfonic acid, used in dilute concentrations, are effective for the hydrolysis. The reaction may be carried out from about 20 to 100° C. but is conveniently effected at the reflux temperature. The reaction is ordinarily complete in from several minutes to 1 hour. A preferred procedure for the hydrolysis is to contact a solvent solution of the 21-amine salt with an anion exchange resin on the hydrogen cycle. Suitable resins are those shown in U. S. Patents 2,597,494; 2,597,440; 2,570,822; 2,567,836 and 2,543,666. Trade names of specific resins are Amberlite IR–105, Amberlite IR–120, and Amberlite IR–100 (produced by Rohm & Haas Co.).

The salts of the 21-phosphate derivative of 9α-fluorocortisone and hydrocortisone may be prepared by reacting the compound with an aqueous solution of alkali or alkaline earth bases or salts such as hydroxides, carbonates, bicarbonates or acetates. The product may be recovered by the addition of a non-solvent to precipitate the salt. Typical examples of salts which may be formed are sodium, calcium, potassium, magnesium, barium, ammonium and the like. By controlling the amount of reactants both the mono and the di salts may be formed.

The following examples are given for purpose of illustration:

EXAMPLE 1

*9α-fluoro-3-ethylenedioxy-5-pregnene-11β,17α-21-triol-20-one*

A mixture of 2.0 g. of 9α-fluoro-4-pregnene-11β, 17α, 21-triol-3,20-dione and 4.0 ml. of the dioxolane of mesityl oxide in 15 ml. of dry tetrahydrofuran is treated with 0.13 ml. of concentrated sulfuric acid and stirred at room temperature for about two hours. The mixture is then cooled to 0° C. and allowed to stand for approximately 16 hours. Pyridine is added to neutralize the acid and the product is precipitated by the addition of petroleum ether. The crude product thus obtained is obtained in pure form by crystallization from ethanol.

EXAMPLE 2

9α-fluoro-3-ethylenedioxy-5-pregnene-11β,17α,-21-triol-20-one-21-methane sulfonate A mixture of 3.5 g. of 9α-fluoro-3-ethylenedioxy-5-pregnene-11β,17α,21-triol-20-one in 24 ml. of pyridine is prepared and cooled to 0° C. The cooled mixture is then treated with 14 ml. of methane sulfonyl chloride and allowed to stand for three hours at 0° C. The entire reaction mixture is then poured into ice water whereupon the product separates as a solid. The solid product may be removed by filtration and dried. Recrystallization from acetone gives pure product.

EXAMPLE 3

9α-fluoro-21-iodo-3-ethylenedioxy-5-pregnene-11β,17α-diol-20-one

A mixture of 1.5 g. of 9α-fluoro-3-ethylenedioxy-5-pregnene-11β,17α,21-triol-20-one-21-methane sulfonate, 1.1 g. of sodium iodide and 140 ml. of ethanol are refluxed for approximately 30 minutes. The entire reaction mixture is then filtered and the filtrate containing the product concentrated in vacuo to approximately 100 ml. An equal volume of water (100 ml.) is added to the concentrated filtrate and the aqueous mixture concentrated to approximately 150 ml. of an aqueous suspension of the product. The solid material is then collected on a filter, washed with water and dried to give the product as a slightly colored crystalline solid.

EXAMPLE 4

9α-fluoro-3-ethylenedioxy-5-pregnene-11β,17α,21-triol-20-one-21-dibenzyl phosphate Approximately 750 mg. of 9α-fluoro-21-iodo-3-ethylenedioxy - 5 - pregnene - 11β, 17α - diol - 20 - one and 600 mg. of silver dibenzyl phosphate are suspended in 150 ml. of benzene and water is removed by concentrating the mixture to a volume of approximately 75 ml. The concentrated benzene mixture is then refluxed for approximately 16 hours and filtered while hot to separate the silver iodide from the product. The filtrate containing the product is concentrated to a heavy syrup and then redissolved in a minimum quantity of benzene—about 4 ml. The benzene solution of the product may then be diluted with petroleum ether to effect crystallization of the product.

EXAMPLE 5

9α-fluoro-4-pregnene-11β,17α,21-triol-3,20-dione-21-phosphate

A solution of 500 mg. of 9α-fluoro-3-ethylenedioxy-5-pregnene-11β,17α,21-triol-20-one-21-dibenzyl phosphate in 100 ml. of ethanol and 2 ml. of N-methylmorpholine is hydrogenated at 25° C. and at atmospheric pressure in the presence of about 500 mg. of prereduced palladium oxide catalyst. When hydrogenation is complete, the reaction mixture is filtered to remove the catalyst and the filtrate, which contains the N-methylmorpholine salt of 9α - fluoro - 4 - pregnene - 11β,17α,21 - triol - 3,20-dione-21-phosphate, is concentrated in vacuo to a syrupy residue. The syrup is then dissolved in water and the water solution washed with ethyl acetate and ether to remove solvent soluble impurities. When the aqueous solution is concentrated to dryness there is obtained a solid residue, the N-methylmorpholine salt of 9α-fluoro-3-ethylenedioxy - 4 - pregnene - 11β,17α,21 - triol - 20 - one - 21-phosphate. This salt may be converted to the 9α-fluoro- 4 - pregnene - 11β, 17α,21 - triol - 3,20 - dione - 21 - phosphate by shaking with an ion-exchange resin on the hydrogen cycle and evaporation of the aqueous solution to dryness. Other salts of 9α-fluoro-4-pregnene-11β,17α,21-triol-3,20-dione-21-phosphate are produced by reacting it with an aqueous solution of an equivalent amount of an alkali or alkaline earth metal hydroxide, carbonate or bicarbonate, or with ammonium hydroxide. In this manner the sodium, calcium, potassium, magnesium, barium and ammonium salts are prepared.

EXAMPLE 6

9α-fluoro-4-pregnene-17α,21-diol-3,11,20-trione-21-phosphate

The compound 9α-fluoro-4-pregnene-17α,21-diol-3,11,-20-trione-21-phosphate is prepared by the procedure of Examples 1 to 5 by using 9α-fluoro-4-pregnene-17α,21-diol-3,11,20-trione as the starting material in Example 1. The 9α - fluoro - 4 - pregnene - 17α,21 - diol - 3,11,20-trione-21-phosphate is treated with sodium bicarbonate in water. The whole is concentrated to dryness and the residue taken up in water and shaken out with ethyl acetate. The aqueous layer is concentrated to dryness, dissolved in methanol and 1:1 absolute ether-ethanol added to precipitate the sodium salt of 9α-fluoro-4-pregnene-17α,21-diol-3,11,20-trione-21 phosphate.

Any departure from the above description which conforms to the present invention is intended to be included within the scope of the claims.

What is claimed is:

1. A compound selected from the group consisting of 9α - fluoro - 4 - pregnene - 11β,17α,21 - triol - 3,20-dione - 21 - phosphate, 9α - fluoro - 4 - pregnene - 17α, 21 - diol - 3,11,20 - trione - 21 phosphate, and alkali and alkaline earth metal salts thereof.

2. 9α - fluoro - 4 - pregnene - 11β,17α,21 - triol - 3,20-dione-21-phosphate.

3. 9α - fluoro - 4 - pregnene - 17α,21 - diol - 3,11,20-trione-21-phosphate.

4. Sodium salt of 9α - fluoro - 4 - pregnene - 11β,17α, 21-triol-3,20-dione-21-phosphate.

5. Sodium salt of 9α - fluoro - 4 - pregnene - 17α,21-diol-3,11,20-trione-21-phosphate.

6. The process which comprises reacting 9α-fluoro-4-pregnene - 11β,17α,21-triol-3,20-dione with ethylene glycol to form 9α - fluoro - 3 - ethylenedioxy-5-pregnene-11β,17α,21 - triol,20 - one reacting this compound with an organic sulfonyl compound having the formula $R^2SO_2Cl$ wherein $R^2$ is an alkyl group containing less than seven carbon atoms to produce the corresponding 21-sulfonoxypregnene compound, reacting the latter compound with an alkali metal iodide salt to form 9α - fluoro - 21-iodo - 3 - ethylenedioxy - 5 - pregnene - 11β - 17α - diol-20-one, reacting this compound with an organic phosphate having the formula $(R^3CH_2O)_2PO(OH)$ wherein $R^3$ is a phenyl group to form the corresponding 21-organic phosphate compound, reacting the 21-organic phosphate compound with hydrogen in the presence of a noble metal hydrogenation catalyst and a tertiary amine containing three to eight carbon atoms to form a tertiary amine salt of 9α - fluoro - 3 - ethylenedioxy - 5 - pregnene - 11β,17α, 21 - triol - 20 - one - 21 - phosphate and hydrolyzing the amine salt by treating with strong acid to form 9α-fluoro- 4 - pregnene - 11β,17α,21 - triol - 3,20 - dione - 21 - phosphate.

7. The process which comprises reacting 9α-fluoro-4-pregnene - 11β,17α,21 - triol - 3,20 - dione with ethyleneglycol to form 9α - fluoro - 3 - ethylenedioxy - 5 -pregnene - 11β,17α,21 - triol - 20 - one reacting the compound with methanesulfonyl chloride to form 9α - fluoro - 3-ethylenedioxy - 5 - pregnene - 11β,17α,21 - triol - 20-one - 21 - methanesulfonate, reacting this latter compound with sodium iodide to form 9α - fluoro - 21 - iodo- 3 - ethylenedioxy - 5 - pregnene - 11β,17α,diol - 20 - one, reacting this compound with silver dibenzyl-phosphate to form 9α - fluoro - 3 - ethylenedioxy - 5 - pregnene - 11β, 17α,21 - triol - 20 - one - 21 - dibenzyl-phosphate, hydrogenating the 21 - dibenzyl - phosphate compound in the presence of palladium oxide and N-methylmorpholine to form a N-methylmorpholine salt of 9α - fluoro - 3 - ethylene - dioxy - 5 - pregnene - 11β,17α,21 - triol - 20 - one-21-phosphate and treating the amine salt with an ion exchange resin to form 9α - fluoro - 4 - pregnene - 11β,17α, 21 - triol - 3,20 - dione - 21 - phosphate.

8. The process which comprises hydrolyzing a compound having the formula

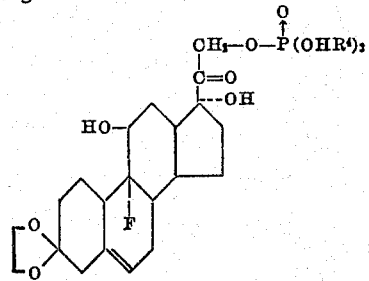

wherein $R^4$ is a tertiary amine containing from three to eight carbon atoms by reacting with a strong acid to form 9α - fluoro - 4 - pregnene - 11β,17α,21 - triol - 3,20 - dione - 21 - phosphate.

References Cited in the file of this patent

UNITED STATES PATENTS 2,707,190     Farrar _____ Apr. 26, 1955

OTHER REFERENCES

Freid: JACS, March 5, 1954, pp. 1455–56.
Freid: JACS, May 5, 1953, pp. 2273–74.